United States Patent [19]
Tatebayashi et al.

[11] Patent Number: 4,877,397
[45] Date of Patent: Oct. 31, 1989

[54] PLANT FOR MANUFACTURING CEMENT CLINKER

[75] Inventors: June Tatebayashi, Takarazuka; Tomoaki Takada, Tokyo; Kimitaka Hayashi, Kakogawa; Chikanori Kumagai, Kobe, all of Japan

[73] Assignee: Kawasaki Jukogyo Kabushiki Kaisha, Japan

[21] Appl. No.: 154,433

[22] Filed: Feb. 9, 1988

[30] Foreign Application Priority Data

| Apr. 1, 1986 [JP] | Japan | 61-75131 |
| Aug. 29, 1986 [JP] | Japan | 61-204302 |
| Nov. 21, 1986 [JP] | Japan | 61-279468 |

[51] Int. Cl.⁴ .................................................. F27B 15/00
[52] U.S. Cl. .................................... 432/106; 110/245; 432/58
[58] Field of Search ................ 432/106, 58, 15; 110/245

[56] References Cited

U.S. PATENT DOCUMENTS

| 3,397,657 | 8/1968 | Tada | 110/245 |
| 3,731,398 | 5/1973 | Niems | 432/78 |
| 3,970,011 | 7/1976 | Virr et al. | 110/245 |
| 4,021,193 | 5/1977 | Waters | 432/58 |
| 4,177,742 | 12/1979 | Uemura et al. | 110/245 |
| 4,244,305 | 1/1981 | Kawano et al. | 110/245 |
| 4,249,472 | 2/1981 | Mitchell | 110/245 |
| 4,455,969 | 6/1984 | Barker | 110/245 |
| 4,480,392 | 11/1984 | Luthi | 432/58 |
| 4,506,608 | 3/1985 | Strohmeyer et al. | 110/245 |
| 4,538,549 | 9/1985 | Stromberg | 110/245 |
| 4,616,426 | 10/1986 | Lange | 432/58 |
| 4,616,576 | 10/1986 | Engstrom | 110/245 |
| 4,693,682 | 9/1987 | Lee et al. | 110/245 |

FOREIGN PATENT DOCUMENTS

| 0804215 | 2/1974 | Belgium . |
| 0050526 | 4/1982 | European Pat. Off. . |
| 0165034 | 12/1985 | European Pat. Off. . |
| 60-1548 | 1/1985 | Japan . |
| 60636 | 1/1985 | Japan . |
| 60637 | 1/1985 | Japan . |
| 60-13738 | 4/1985 | Japan . |
| 0852573 | 10/1960 | United Kingdom . |

OTHER PUBLICATIONS

Chemical Abstracts, vol. 98, No. 12, Mar. 1983, p. 309, Abs. #94643k.

Primary Examiner—Henry C. Yuen
Attorney, Agent, or Firm—Leydig, Voit & Mayer

[57] ABSTRACT

A plant for manufacturing cement clinker is constituted by the following portions: a suspension preheater for preheating a cement material powder; a spouted-bed type furnace for granulating the preheated cement material powder; a fluidized-bed type furnace for sintering the granulated cement material powder; a cooling system for cooling the granulated and burned product; a plurality of burners disposed at a lower portion of the spouter-bed type furnace so as to oppose to one another such that their ends are directed obliquely upward and direct streams of fuel to converge on a central axis of the spouted bed, thereby to form a local hot region in the spouted bed; a preheated material charging chute disposed slightly above the local hot region and adapted for charging the preheated material powder from the suspension preheater into the spouted-bed type furnace; and a granulated material discharging chute provided on one side of the local hot region.

18 Claims, 13 Drawing Sheets

PLANT FOR MANUFACTURING CEMENT CLINKER

This application is a continuation of application Ser. No. 031,767, filed Mar. 30, 1987, now abandoned.

BACKGROUND OF THE INVENTION

1. Field of the Invention:

The present invention relates to a plant for manufacturing cement clinker.

2. Description of the Related Art:

A typical conventional plant or apparatus for manufacturing cement clinker incorporates a combination of a fluidized-bed type sintering furnace, a cooling system, an air-preheater, a heat-exchanging cyclone and a dust collector. This conventional apparatus essentially requires the use of nuclide clinker. The nuclide clinker is typically fine particles of clinker and is circulated through a nuclide clinker circulating line. This apparatus, however, suffers from disadvantages such as a large heat loss due to circulation of the nuclide clinker and inefficient recovery of the sensible heat possessed by the burned clinker, resulting in a low thermal efficiency and difficulty in the reduction of fuel consumption.

In order to overcome these problems of the prior art, the present inventors have already proposed, as in Japanese Pat. Publication No. 13738/1985, an apparatus for producing cement clinker without necessitating the use of nuclide clinker. This apparatus includes a suspension preheater composed of a plurality of cyclones, a spouted-bed granulating furnace, a fluidized-bed type sintering furnace, a cooling apparatus and so forth, wherein the lower portion of the spouted-bed type granulating furnace and the upper portion of the fluidized-bed type sintering furnace are connected to each other through a waste-gas duct. More specifically, this apparatus is characterized in that the preheated material from the suspension preheater is charged into the duct which interconnects the cooling system and the spouted-bed type granulating furnace, so that the material is mixed with the hot cooling air extracted from the cooling system while exchanging heat therebetween, the mixture being then fed to the spouted-bed type granulating furnace. With this arrangement, it is possible to eliminate the problem that the molten component of the material adheres to and grows on the inner surface of the duct interconnecting the cooling system and the granulating furnace so as to coat the inner surface of the duct. In addition, it is possible to make an efficient use of the heat collected from the cement clinker cooling system.

In operation of the apparatus disclosed in Japanese Unexamined Pat. Publication No. 13738/1985, the atmosphere in the spouted-bed type granulating furnace is maintained at a liquid-phase generating temperature which generally ranges between 1250° and 1350° C. Partly because the burner of the spouted-bed type granulating furnace in this apparatus is provided on the straight barrel wall of the furnace, and partly because the air suspending the material to be calcined is introduced such as to cover the region near the inner surface of the wall of the granulating furnace, the fuel supplied from the burner does not form any local hot region which would exhibit a temperature much higher than the temperature in the peripheral region. In consequence, a substantially uniform temperature distribution is realized in the spouted bed. The substantially uniform temperature distribution, i.e., lack of a hot local region, inevitably reduces the amount of liquid phase which is formed by melting of the cement material powder. In consequence, the granules formed in the granulating furnace tend to have too small and non-uniform sizes, and the granulation takes place only at a small rate. The generation of the liquid phase would be increased by rising the temperature of the spouted bed. However, in this known apparatus, the bed temperature rises uniformly so that the stability of the spouted bed tends to be impaired due to agglomeration in the bed.

SUMMARY OF THE INVENTION

Accordingly, an object of the present invention is to provide a plant which is capable of promptly and stably producing cement clinker of large and uniform particle sizes.

To this end, according to one aspect of the present invention, there is provided a plant for manufacturing cement clinker comprising: a suspension preheater for preheating a cement material powder; a spouted-bed type furnace for granulating the preheated cement material powder; a fluidized-bed type furnace for sintering the granulated cement raw material; a cooling system for cooling the granulated and burned product; a plurality of burners disposed at a lower portion of the spouted-bed type furnace so as to oppose to one another such that their ends are directed obliquely upward, thereby to form a local hot region in the spouted bed; a preheated material charging chute disposed slightly above the local hot region and adapted for charging the preheated material powder from the suspension preheater into the spouted-bed type furnace; and a granulated material discharging chute provided on one side of the local hot region.

With this arrangement, since a local hot region is formed in the spouted bed of the spouted-bed type granulating furnace, so that it becomes possible to stably and efficiently produce cement clinker having uniform and large sizes generally ranging between 2 and 3 mm. In addition, the power consumption for grinding the clinker can be reduced. Furthermore, since the grain size of the cement clinker is uniform, the heat recovery efficiency in the cooling system is remarkably improved and the fuel consumption in the plant is appreciably decreased.

According to another aspect of the present invention, there is provided a plant for manufacturing cement clinker comprising: a suspension preheater for preheating a cement material powder; a spouted-bed type furnace for granulating the preheated cement material powder; a fluidized-bed type furnace for sintering the granulated cement material powder; a cooling system for cooling the granulated and burned product; a draft tube disposed in the spouted bed in the spouted-bed type furnace such that a gap is formed between the draft tube and the bottom of the spouted-bed type furnace; a burner means disposed under the draft tube so as to cooperate with the draft tube in positively forming a local hot region in the draft tube and moving the granules into the draft tube through the gap; a preheated material charging chute disposed slightly above the local hot region and adapted for charging the preheated material powder from the suspension preheater into the spouted-bed type furnace; and a granulated material discharging chute provided on one side of the local hot region.

According to this arrangement, the combustion gas coming into the spouted-bed type furnace is introduced into an upper portion of the furnace through the draft tube. The combustion gas is accompanied by the fuel, fluidized particles and the cement material powder, so that the fuel is burnt in the draft tube so as to form a local hot region, whereby the cement material powder attaches to the surface of the fluidized particles thus promoting the granulation of the cement material powder. Meanwhile, the fluidized particles outside the draft tube are cooled by the cement material and the particles recycled from the cyclone, as well as by heat radiation. In addition, the combustion gas does never flow towards the conical lower portion of the spouted-bed type furnace, so that the particles in the bottom portion of the furnace are not heated. This in turn reduces the sticking force between the particles, thus suppressing any tendency of agglomeration and deposition of the particles to the wall surfaces in the conical lower portion of the furnace.

According to a third aspect of the present invention, there is provided a plant for manufacturing cement clinker comprising: a suspension preheater for preheating a cement material powder; granulating and sintering furnace for granulating and sintering the preheated cement material powder and provided with a spouted bed; a plurality of burners disposed in a lower portion of said spouted-bed type furnace and adapted for forming a local hot region in the spouted bed; a charging chute provided slightly above the local hot region and adapted for charging the preheated cement material powder from the suspension preheater; and a discharge chute disposed on one side of the local hot region and adapted for discharging the cement raw material which has been at least granulated.

This arrangement reduces the cost of the apparatus for producing cement clinker, thanks to the elimination of the fluidized-bed type furnace.

The above and other objects and advantages of the invention will become clear from the following description of the preferred embodiments taken in conjunction with the accompanying drawings. It is to be noted, however, the forms and arrangements of various constituent parts of the described embodiments are only illustrative and are not intended for limiting the scope of the invention unless otherwise specified.

DESCRIPTION OF THE PREFERRED EMBODIMENTS

First Embodiment

Figure 1:
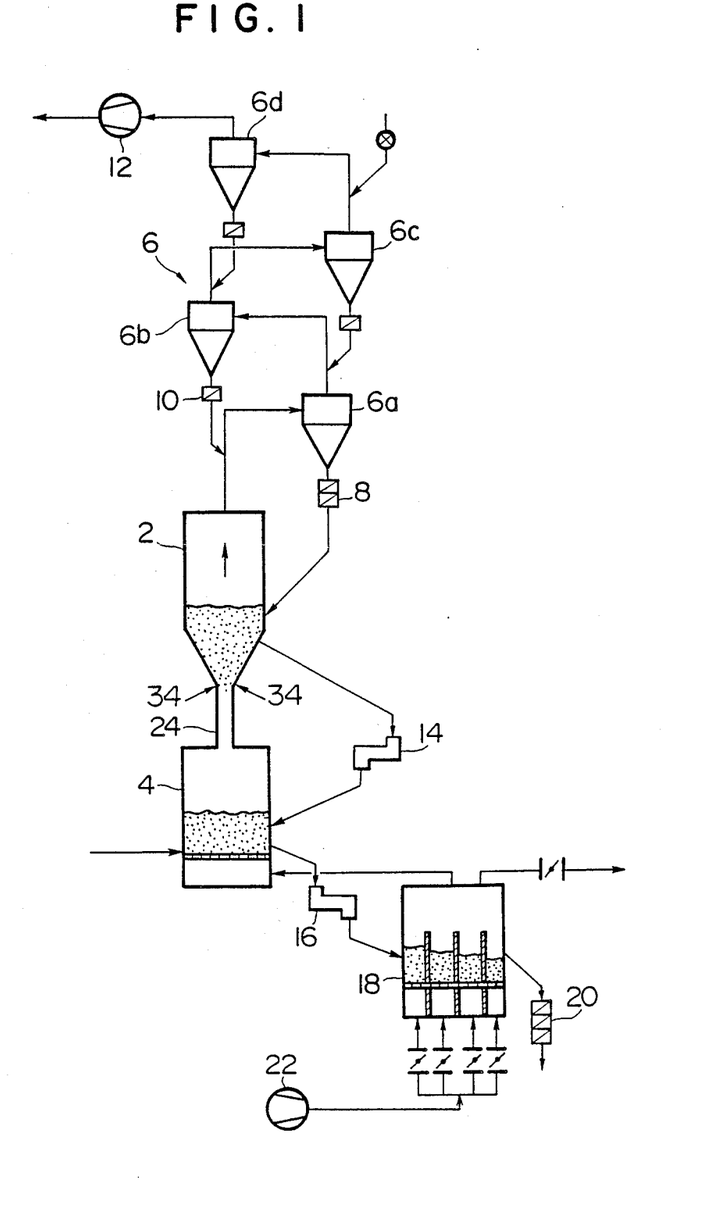
FIG. 1 is a partly-sectioned side elevational view of a first embodiment of an apparatus of the present invention for producing cement clinker.
Figure 2:
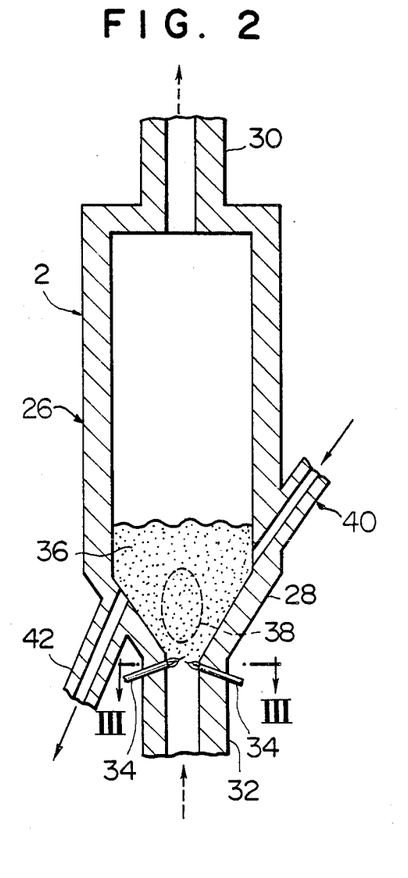
FIG. 2 is an enlarged sectional side elevational view of an example of a spouted-bed type granulating furnace which is incorporated in the embodiment shown in FIG. 1.
Figure 3:
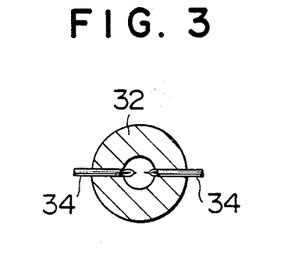
FIG. 3 is a sectional view taken along the line III—III of FIG. 2.

Referring to FIGS. 1 to 3, cement material powder is preheated in a suspension preheater 6 composed of cyclones 6a, 6b, 6c and 6d by the heat of exhaust gases from a spouted-bed type granulating furnace 2 and a fluidized-bed type sintering furnace 4. The cement material powder is progressively transferred through the successive cyclones 6d, 6c, 6b and 6a and is fed into the spouted-bed type granulating furnace 2 through a double-flap damper 8 so as to be granulated in the furnace 2. In these Figures, a reference numeral 10 designates a flap damper, while a numeral 12 denotes an induced fan.

The cement material powder, which has not been granulated in the spouted-bed type furnace 2, is recirculated to the spouted-bed type granulating furnace 2 through the cyclone 6a. The particles staying in the spouted-bed type granulating furnace and having grown therein is discharged to a fluidized-bed type sintering furnace 4 through an L-shaped gas-tight seal device (referred to as "L" valve, hereinafter) which makes use of a material seal of the granulated material, so as to be burned in the latter at a temperature between 1400° and 1500° C. The thus burned cement clinker is discharged, through an L valve 16 for example, to a cooling system such as a fluidized-bed type cooler so as to be cooled and then taken out as the final product.

On the other hand, the cooling air charged into the cooling system 18 by a forced draft fan 22 makes a heat exchange with the burned clinker so as to be heated by the latter and is supplied as combustion air to the fluidized-bed type furnace 4. Any excess air from the cooling system 18 is discharged to the outside through a dust collector which is not shown.

The combustion gas of the fluidized-bed type sintering furnace 4 is used for burning the fuel which is supplied from a burner disposed in a lower portion of the spouted-bed type granulating furnace 2 and the gas produced as a result of the burning is discharged as waste gas from the top of the spouted-bed type granulating furnace 2. This gas is made to pass through the successive cyclones 6a, 6b, 6c and 6d in the suspension preheater 6 so as to preheat the cement material powder, and is then exhausted to the atmosphere by the induced fan 12 through a dust collector (not shown). The top of the fluidized-bed type sintering furnace 4 is connected to the bottom of the spouted-bed type granulating furnace through a waste gas duct 24.

As will be seen from FIGS. 2 and 3, the spouted-bed type granulating furnace 2 is composed of a straight barrel portion 26 and a conical portion 28, and is provided in the top end portion thereof with a waste gas discharge duct 30 and also with a throat portion 32 in the bottom end portion thereof. The throat portion 32 is connected to the waste gas duct 24. A plurality of burners, e.g. two burners as in the illustrated embodiment, are disposed such as to oppose to each other in a region in the vicinity of the juncture between the conical end portion 28 and the throat portion 32 of the spouted-bed type granulating furnace 2, such that the ends of these burners are directed obliquely upward. With this arrangement, it is possible to form a local hot region 38 in a portion of the spouted bed 36 above the ends of the burners 34, the local hot region 38 exhibiting a temperature which is generally about 100° to 150° C. higher than that in the peripheral region of the spouted bed. A preheated material inlet chute 40 is provided slightly above the juncture between the conical portion 28 and the straight barrel portion 26, while a granule discharge chute 42 is disposed slightly below the juncture between the conical portion 28 and the straight barrel portion 26.

With this arrangement, it is possible to develop a bed temperature of about 1300° to 1400° C. in the spouted bed 36, by suitably selecting the velocity of the gas in the throat portion, while creating a high temperature of about 1400° to 1550° C. in the local hot region 38. As the preheated powder material of cement is charged into this local hot region, the powder material is quickly molten and is burned through self-granulation while it is suspended and stagnant in the spouted bed 36. It will be understood that the granulation can be effected without requiring supply of any nuclide clinker into the spouted bed 36. It is also possible to omit the fluidized-bed type sintering furnace 4 as in the case of a fourth embodiment which will be explained later.

The granules of the cement material thus formed is discharged through the granule discharge chute 42 and is fed into the fluidized-bed type sintering furnace 4.

Figure 4A:
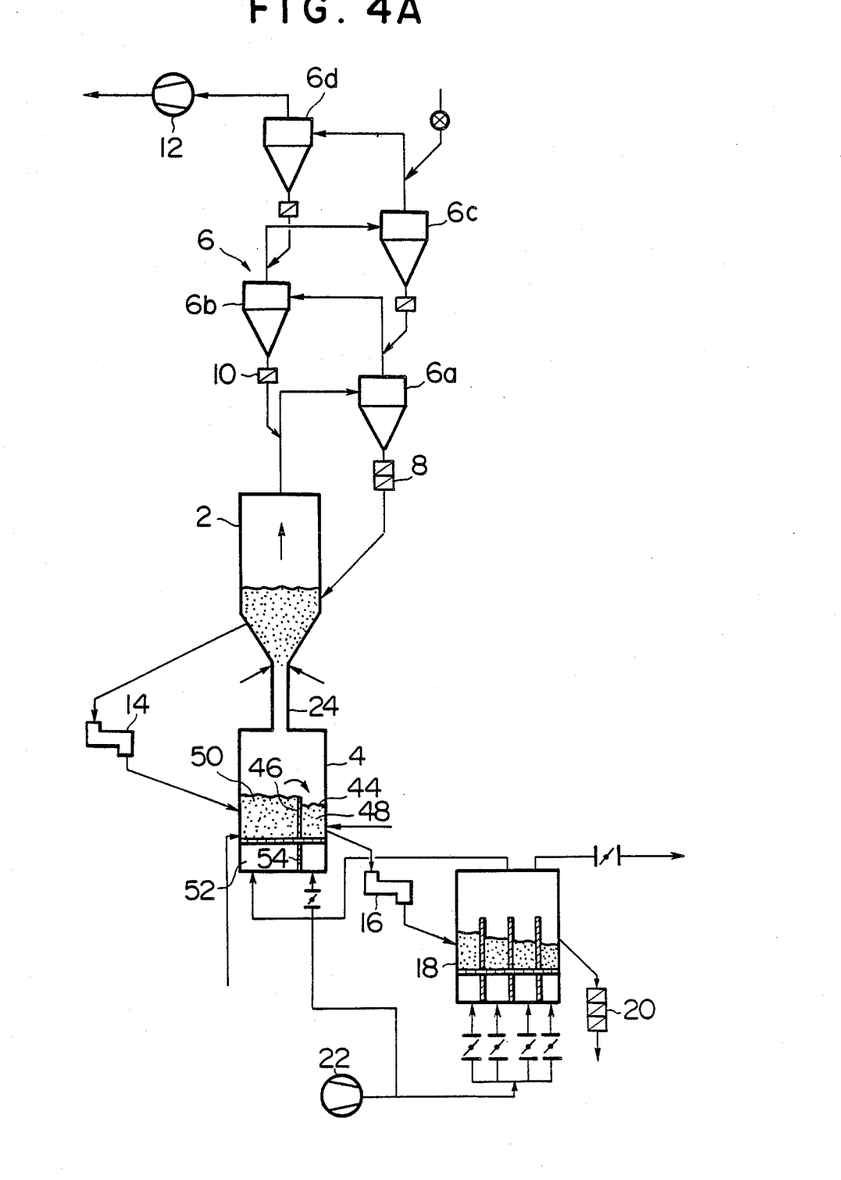
FIG. 4A is a partly-sectioned side elevational view of a second embodiment of the apparatus of the present invention for producing cement clinker.

Second Embodiment:

FIG. 4 shows a second embodiment of the apparatus of the present invention for producing cement clinker. As will be seen from this Figure, the fluidized bed 44 in the fluidized-bed type sintering furnace 4 is partitioned by a partition plate 46 into a small fluidized bed 48 and a large fluidized bed 50. The window box 52 in this furnace also is divided by a partition plate 54 which is positioned in alignment with the first-mentioned partition plate 46.

In operation, the granules are burned to become cement clinker at a firing temperature of about 1400° to 1500° C. in the large fluidized bed 50 of the fluidized sintering furnace 4. The thus burned cement clinker overflows the partition plate 46 into the small fluidized-bed 48.

The small fluidized-bed chamber is maintained at a temperature which is lower than the sintering temperature (bed temperature) in the large fluidized bed 50. Thus, the temperature in the small fluidized bed is, for example, about 1200° to 1000° C. In consequence, the cement clinker fired in the large fluidized bed 50 is instantaneously cooled down to the bed temperature of the small fluidized bed 48. Thus, the fired clinker is rapidly cooled from about 1350° C. down to about 1200° C. so as to become cement clinker of a high quality. The cement clinker rapidly cooled in the small fluidized bed 48 is discharged to the cooling system 18 through the L-valve 16 which serves to keep the cement clinker away from the ambient air. The cement clinker is then further cooled in the cooling system.

Figure 4B:
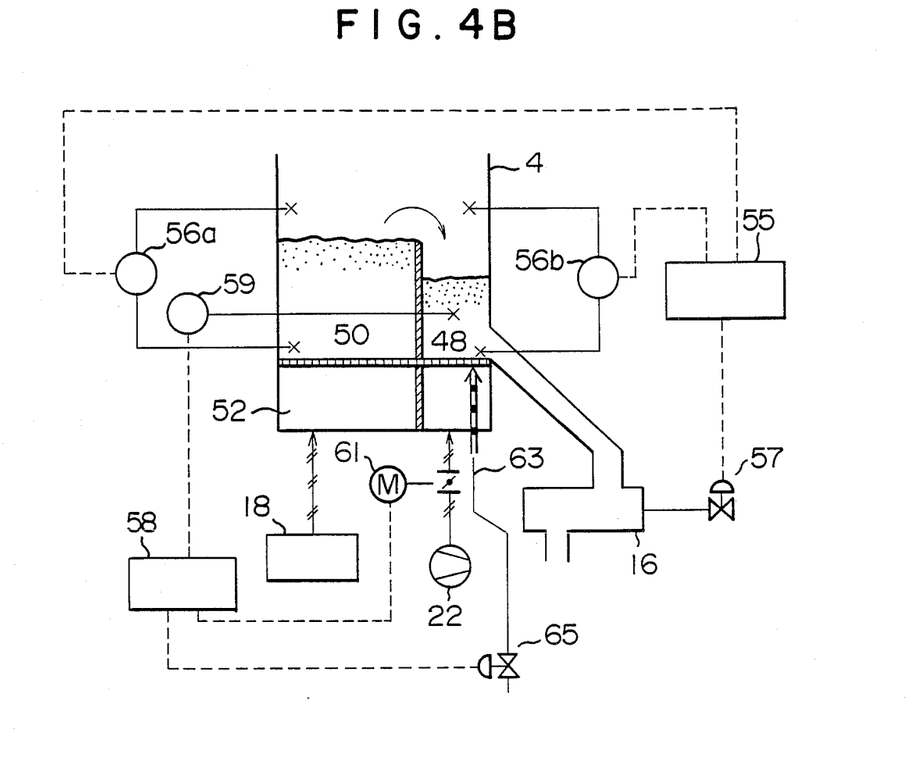
FIG. 4B is an enlarged sectional side elevational view showing a modification of the fluidized calcining furnace of the second embodiment.

In order to rapidly cool the cement clinker without increasing the fuel consumption, an additional arrangement is preferably provided. This arrangement is shown in FIG. 4B and comprises an arithmetic unit 55, two differential pressure gauges 56a, 56b for measuring the pressure drop across the small fluidized bed 48 and across the large fluidized bed 50, respectively, and an air-pulse injector e.g. a valve 57 for injecting an air-pulse into the L-valve 16. The arithmetic unit 55 is connected to the differential pressure gauge 56a and to the differential pressure gauge 56b. The arithmetic unit 55 is also connected to the air-pulse injector 57 to operate the L-valve 16. The injector 57 injects the air-pulse to blow the cement clinker out in the L-valve 16 so that the cement clinker in the small fluidized bed 48 can be discharged. According to this arrangement, the air-pulse injector 57 injects the air-pulse according to the signal from the arithmetic unit 55 so that the pressure drop across the small fluidized bed 48 is always less than the pressure drop across the large fluidized bed 50. It follows that the cement clinker can be rapidly cooled without increasing the fuel consumption.

In order to ensure the cement clinker stabilization of high quality, another additional arrangement is preferably provided. Tis arrangement is also shown in 4B and comprises an arithmetic unit 58, a thermometer 59, a motor 61 connected to the arithmetic unit 59 for adjusting the opening of a damper 63 and a fuel valve 65 for adjusting the fuel supply to the small fluidized bed 48. The damper 63 is one provided to the air line between the forced draft fan 22 and the sintering furnace 4. When the temperature of the small fluidized bed 48 is higher than the predetermined temperature, the motor 61 opens the damper 63 to increase the fluidizing air from the forced draft fan 22. To the contrary, when the temperature of the small fluidized bed 48 is less than the predetermined one, the motor 61 decreases the opening of the damper 63 and/or the arithmetic unit 58 increases the opening of the fuel valve 65. According to this arrangement, cooling condition in the small fluidized bed 48 becomes constant so that the quality of the cement clinker can be stabilized.

If there is n provision for fuel supply to the fluidized bed, the bed temperature in the small fluidized bed 48 is determined by the rate of supply of the hot burned cement clinker and the rate of the fluidizing air supplied to the small fluidized bed 48. Therefore, in the event that the yield of the cement clinker per unit time must be decreased due to the disturbance to the operation, the bed temperature in the small fluidized bed 48 is lowered to decrease the gas velocity o that the fluidity in the small fluidized bed 48 is impaired with the result that the cooling of the cement clinker and transfer of the same to the L-valve 16 are impeded. In order to avoid such a case, it is advisable to supply a small amount of fuel into the small fluidized bed 48 so as to maintain a temperature in the small fluidized bed 48 which is high enough to provide the gas velocity necessary for sufficiently fluidizing the small fluidized bed 48. Thus, the supply fuel into the small fluidized bed 48 ensures a stable operation of the apparatus and high quality of the cement clinker.

Third Embodiment

Figure 5:
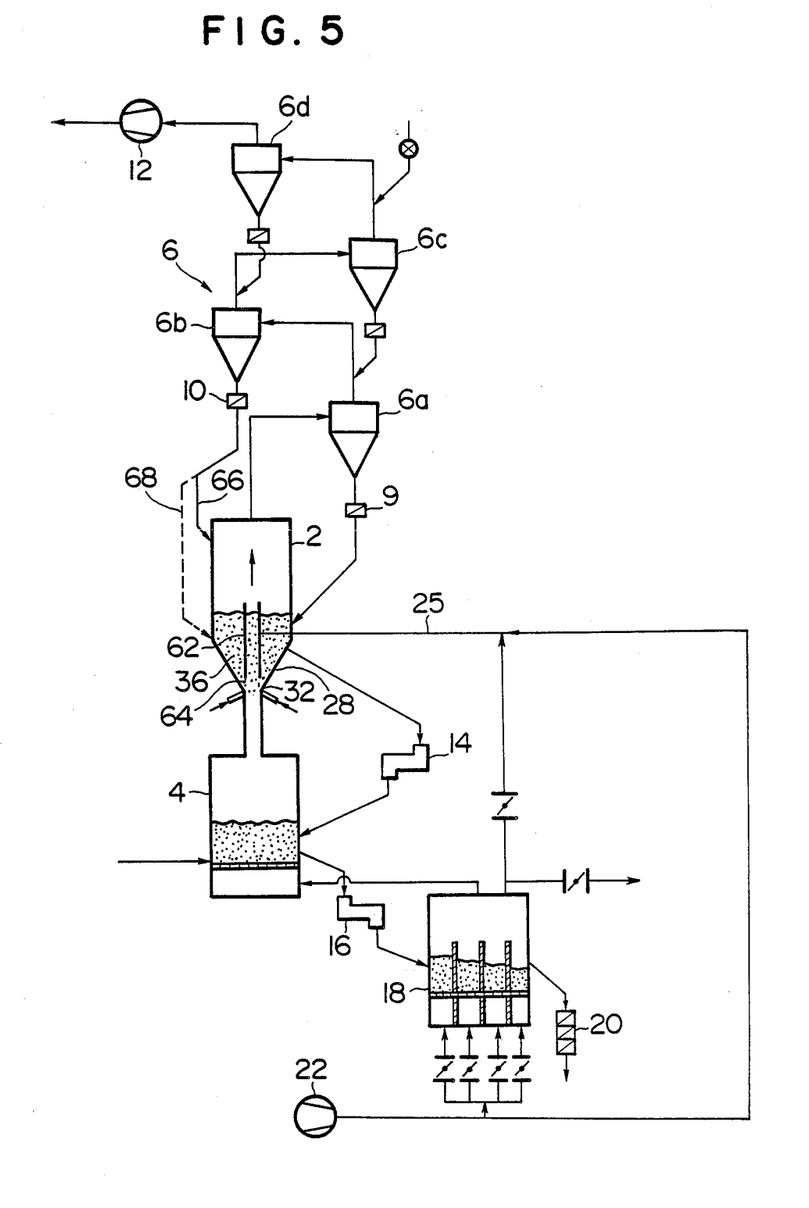
FIG. 5 is a partly-sectioned side elevational view of a third embodiment of the apparatus of the present invention for producing cement clinker.
Figure 6:
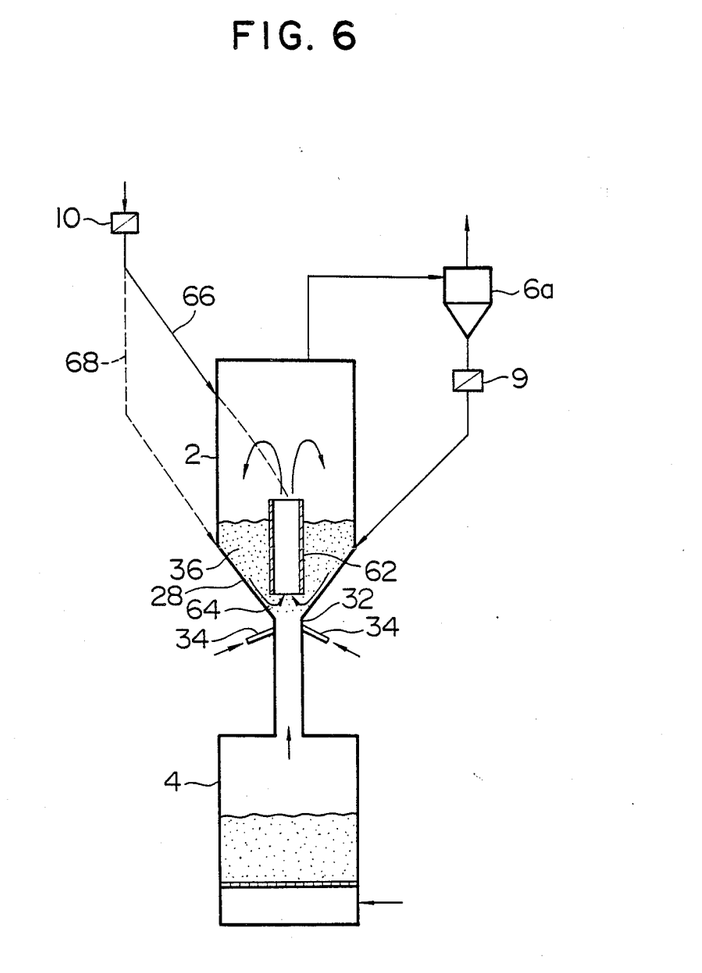
FIG. 6 is an enlarged sectional side elevational view of a spouted-bed type granulating furnace which is incorporated in the embodiment shown in FIG. 5, as well as an arrangement around the granulating furnace.

Referring to FIGS. 5 and 6, a draft tube 62 in the form of a short pipe piece is disposed in the spouted bed 36 in the spouted-bed type granulating furnace 2 such that the upper end of the draft tube 62 projects slightly above the spouted bed 36 while a small gap 64 is formed between the lower end of the draft tube 62 and the conical portion 28 on the bottom of the spouted-bed type granulating furnace 2. The draft tube 2 need not always project above the upper surface of the spouted bed 36 but may completely disappear from the same. A burner means 34 is provided in the vicinity of the throat portion 28 under the draft tube 62 such as to positively form a local hot region. Preferably, the burner means 34 is composed of a plurality of burners which are arranged to oppose one another with their ends directed obliquely upward.

The cement material is charged into the spouted-bed type granulating furnace through a material charging chute 66 and/or the material charging chute 68. The arrangement is such that, when the upper material charging chute 66 is used, the charged material fall onto the region near the upper end of the draft tube 62. This arrangement effectively lowers the temperature of the half-molten granules, thus eliminating any deposition of the granules.

Figure 7:
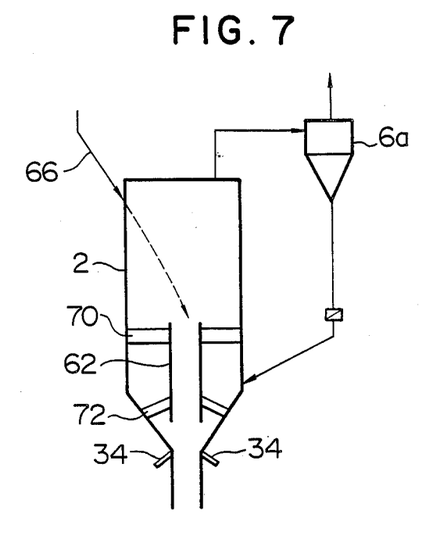
FIGS. 7, 8 and 10 are enlarged sectional side elevational views of modifications of the spouted-bed type granulating furnace and portions there around in the third embodiment.

FIG. 7 shows a modification in which the draft tube 62 is fixed by means of support members 70 and 72.

Figure 8:
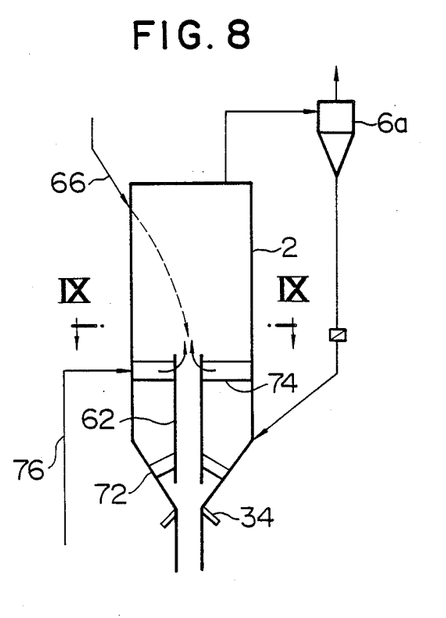
Figure 9:
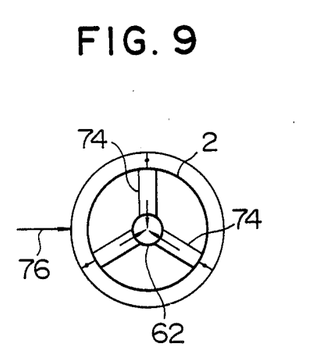
FIG. 9 is a sectional view taken along the line IX—IX of FIG. 8.

FIGS. 8 and 9 show another modification in which cooling air is introduced into the region near the upper end of the draft tube 62. More specifically, in this modification, ducts 74 serving also as support members are connected to the draft tube 62 at an upper portion of the latter and a cooling air supply pipe 76 is connected to these ducts 74 so as to supply cooling air discharged from a cooler or ambient air.

Figure 10:
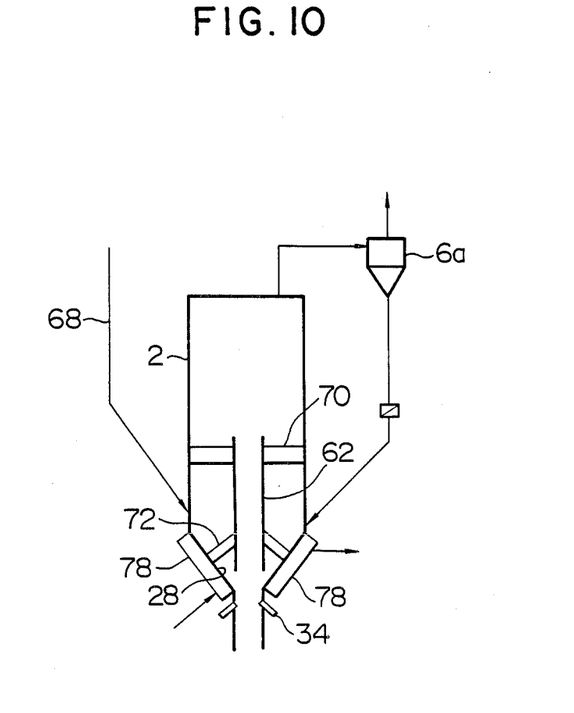

FIG. 10 shows still another modification in which a cooling is effected indirectly by supplying water or air into a jacket 78 in the vicinity of the lower conical portion 28 of the spouted-bed type granulating furnace 2. The arrangements shown in FIGS. 5 to 10 are suitably combined so as to constitute the apparatus in accordance with the third embodiment of the present invention.

The operation of the third embodiment is as follows. A combustion gas from the fluidized-bed type sintering furnace 4 is introduced at a high velocity of, for example, about 30 to 50 m/sec into the spouted-bed type granulating furnace 2 through the throat 32 on the lower end of the latter. The gas is then introduced to the upper part of the space in the furnace 2 through the draft tube 62. The gas is accompanied by a fuel, fluidized particles and the cement material powder which are introduced through the inlet of the draft tube 62. In consequence, the fuel is burnt in the draft tube 62 so as to form a local hot region, while the cement material powder attaches to the surfaces of the fluidized particles thus promoting granulation of the cement clinker. The particles outside the draft tube are not overheated because they are cooled by the cement material, particles recycled from the cyclones and through radiant heat transfer, and because the combustion gas never flows into the conical portion 28. In consequence, the sticking force acting between the particles is decreased so as to ensure elimination of agglomeration in the conical portion 28 further to the first embodiment described before. At the same time, attaching of the particles to the wall surface is avoided for the same reason.

Figure 11:
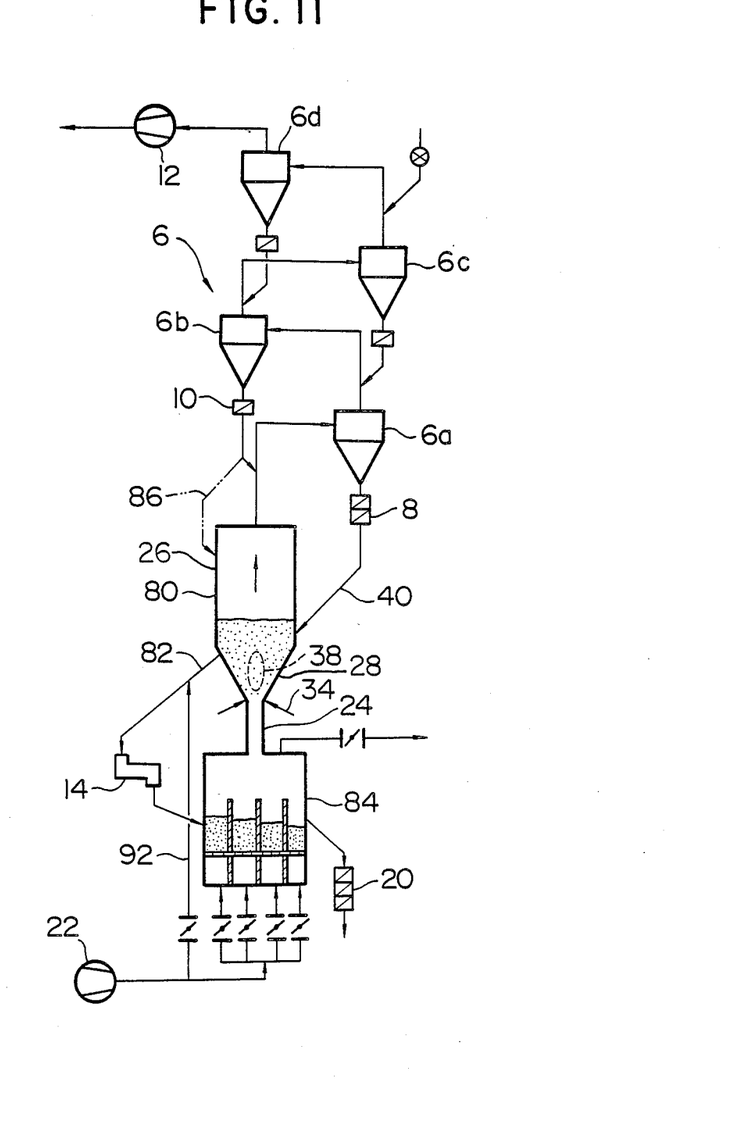
FIG. 11 is a partly-sectioned side elevational view of fourth and fifth embodiments of the apparatus of the invention for producing cement clinker, in which the fourth embodiment is illustrated by solid lines while the fifth embodiment is shown with parts illustrated by one-dot-and-dash line in addition to the constituents of the fourth embodiment.

Fourth Embodiment:

As will be understood from FIG. 11, the fourth embodiment of the present invention lacks the fluidized-bed type sintering furnace 4 in the first embodiment shown in FIG. 1. More specifically, referring to FIG. 11, the granulated and burned product stagnant and granulated in the spouted-bed type furnace 80 is discharged through a discharge chute 82 which is connected to a portion slightly below the juncture between the conical portion 28 and the barrel portion 26 of the spouted-bed type furnace 80, by the operation of the L valve 14 which makes use of a material seal constituted by the granulated and burned product. The product is then delivered to a cooling system 84 such as a fluidized-bed cooler or a moving-bed cooler so as to be cooled in the latter.

Fifth Embodiment:

The fifth embodiment of the invention features, as shown in FIG. 11, a cement material charging chute 86 connected to an upper portion of the spouted-bed type furnace 80 for the purpose of charging at least a part of the cement material powder. The cement material charging chute 86 is connected such that the preheated cement material powder from the cyclone 6b is charged therethrough. The cement material powder charged through this chute 86 effectively lowers the temperature of the half-molten granules so as to prevent any sticking of the granules to the inner wall surfaces in the upper part of the spouted-bed type furnace 80. In addition, since the preheated cement material powder is decarbonized in the upper space of the spouted-bed type furnace 80, it is possible to maintain the required high temperature in the local hot region 38 despite the charging of the cement material powder into the local hot region 38 through the preheated material charging chute 40. In consequence, it becomes possible to attain high granulation and sintering speeds, while ensuring large uniform sizes of the granulated and burned product.

Figure 12:
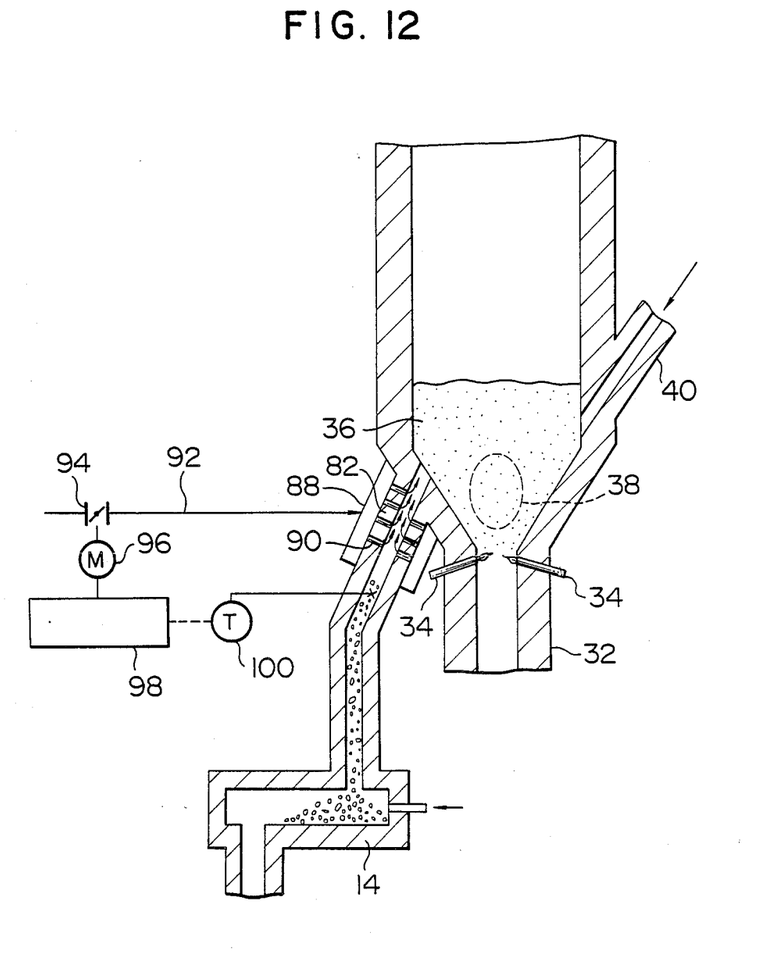
FIG. 12 is an enlarged sectional side elevational view of a modification of the sixth embodiment of the apparatus of the invention for producing cement clinker.

Sixth Embodiment:

The sixth embodiment is basically the same as the fourth embodiment but is distinguished from the same in the following respects. Referring to FIG. 12, the fourth embodiment is modified such that it has a jacket 88 around the upper inlet of the granulated/burned product discharge chute 82. A multiplicity of holes 90 are formed in the portion of the chute 82 within the jacket 88, and the jacket 88 is connected to a cooling air introduction pipe 92 so that cooling air is blown into the chute 82 through the holes 90. The cooling air introduction pipe 92 is provided with a damper 94 which is driven by a motor 96 under the control of a computer 98. The computer 98 is adapted for receiving a signal from a thermometer 100 adapted for detecting the temperature of the cement clinker after the cooling. In response to this signal, the computer 98 controls the motor 96 and, hence, the damper 94 such as to control the flow rate of the cooling air such that the burned cement clinker is rapidly cooled from 1350° C. down to 1200° C. thereby ensuring high quality of the product and ensuring that the temperature of the cement clinker after the cooling does not exceed 1200° C. The cooling air introduction pipe 92 may be branched from the outlet line of the forced draft fan 22 as shown in FIG. 11.

Seventh Embodiment:

The seventh embodiment of the present invention is basically an improvement in the conical portion of the spouted-bed type furnace in each of the first to sixth embodiments described hereinbefore.

Figure 13:
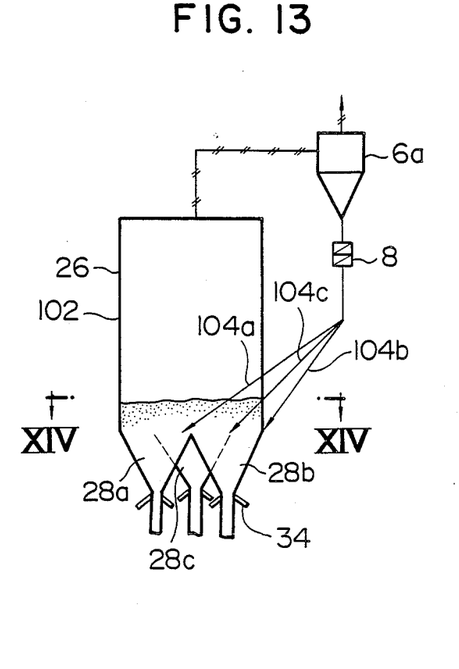
FIG. 13 is an enlarged sectional side elevational view showing a portion around a spouted-bed type furnace used in a seventh embodiment of the apparatus of the invention for producing cement clinker.
Figure 14:
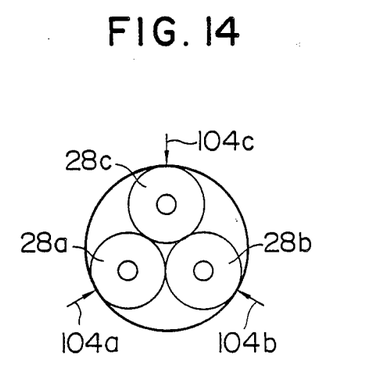
FIG. 14 is a sectional view taken along the line XIV—XIV of FIG. 13.

Referring to FIGS. 13 and 14, the lower end portion of the spouted-bed type furnace 102 is branched into a plurality of, e.g., three cones 28a, 28b and 28c each having a maximum diameter smaller than the furnace diameter, i.e., the diameter of the barrel portion 26. Each cone is provided at the lower portion thereof with a plurality of burners 34. In the illustrated case, each cone is provided with two burners 34. The preheated material powder from the cyclone 6a is charged into these cones 28a, 28b and 28c through respective material charging chutes 104a, 104b and 104c.

Figure 15:
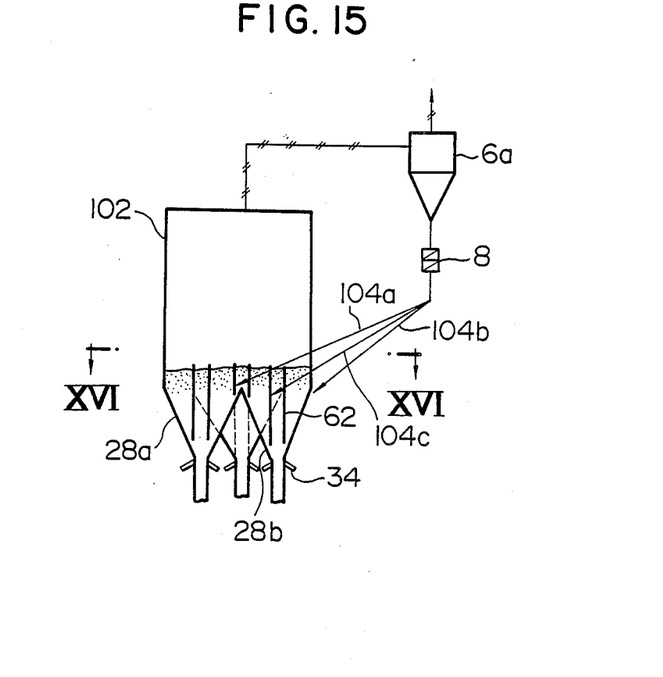
FIG. 15 is an enlarged sectional side elevational view of a modification of the embodiment shown in FIG. 13.
Figure 16:
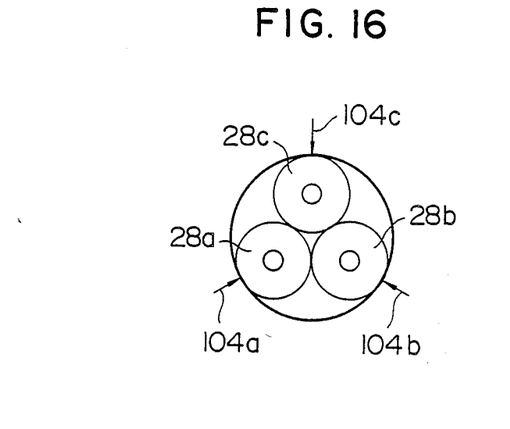
FIG. 16 is a sectional view taken along the line XVI—XVI of FIG. 15.

FIGS. 15 and 16 show an example which is obtained by applying the seventh embodiment to the conical portion of the spouted-bed type furnace in the third embodiment of the clinker apparatus of the invention. In this example, draft tubes 62 in the form of short pipe pieces are mounted and fixed such that gaps are formed between their lower ends and the corresponding cones 28a, 28b and 28c in the bottom of the spouted-bed type granulating furnace 102. Burners 34 are disposed on a lower portion of each draft tube 62.

Figure 17:
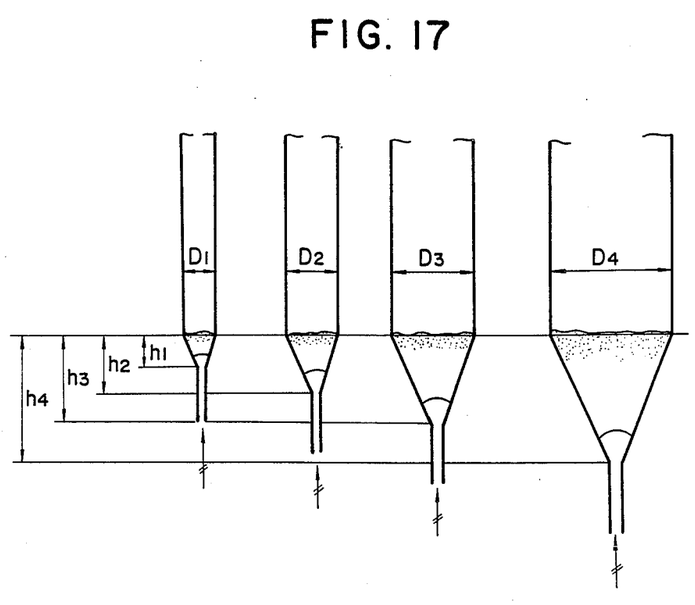
FIGS. 17 and 18 are schematic representation and graph, respectively, for explaining the relation between the bed height and the pressure drop across the bed.
Figure 18:
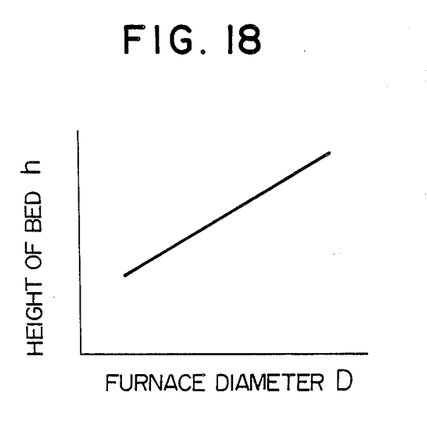

In general, an increase in the furnace diameter D (diameter of the barrel portion 26) of the spouted-bed type granulating furnace causes an increase in the height "h" of the bed as shown in FIG. 17. The pressure loss in the furnace, i.e., the pressure drop across the bed, is proportional to the bed height "h". Therefore, as the furnace diameter D is increased, the pressure drop P across the bed is increased as shown in FIG. 18. The increase in the pressure drop P leads to an increase in the power consumption and, hence, be avoided preferably. In this connection, it is to be noted that the seventh embodiment can suppress the increasing tendency of the pressure loss even when the spouted-bed type furnace is large, because the maximum diameter in the conical portion is reduced. In addition, the cost of the apparatus as a whole is reduced thanks to the fact that the overall height of the spouted-bed type granulating furnace is decreased as compared with the cases of the ordinary arrangements.

What is claimed is:

1. A plant for manufacturing cement clinker comprising:
   a suspension preheater in which a cement material powder is preheated;
   granulating and sintering means for granulating and sintering the preheated cement material powder including a spouted bed furnace section provided with a spouted bed;
   said spouted bed furnace section having a straight barrel portion, a conical portion formed below said straight barrel portion, and a central throat portion connected to the bottom end portion of said conical portion so as to blow combustion air upwardly into said conical portion;
   a plurality of burners disposed in a region in the vicinity of the juncture between the conical portion and the central throat portion, and arranged to direct fuel along paths upwardly inclined and converging on a central axis of said spouted bed furnace section, whereby the fuel when burned produces a local hot region in which the cement material powder is granulated directly above the central throat portion, the local hot region having a temperature substantially higher than at a peripheral region of said spouted bed furnace section;
   a charging chute provided slightly above the local hot region and charging the preheated cement material powder from the suspension preheater into said furnace section; and
   a discharge chute disposed on one side of the local hot region through which the cement material powder which has been at least granulated is discharged from said furnace section.

2. A plant for manufacturing cement clinker according to claim 1 further including
   a fluidized-bed type furnace in which the granulated cement material powder is sintered;
   a cooling system in which the granulated and burned product is cooled;
   a draft tube disposed in the spouted bed along the central axis of the spouted-bed type furnace such that a gap is formed between the draft tube and the throat portion of the spouted-bed type furnace;
   and wherein said plurality of burners are disposed under the draft tube and direct fuel to be burned in the draft tube thereby positively forming the local hot region in the draft tube and moving the granules into the draft tube through the gap.

3. A plant for manufacturing cement clinker according to claim 2 wherein the spouted-bed type furnace is branched at its lower portion into a plurality of cones, and the burners are provided on a lower portion of each of the cones.

4. A plant for manufacturing cement clinker according to claim 2 wherein the fluidized-bed type furnace includes a partition plate which divides a fluidized bed into a small fluidized bed and a large fluidized bed, and the burned cement material overflows the partition plate into the small fluidized bed.

5. A plant for manufacturing cement clinker according to claim 4 wherein the fluidized-bed type furnace further includes means for maintaining a differential pressure of the small fluidized bed lower than that of the larger fluidized bed.

6. A plant for manufacturing cement clinker according to claim 4 wherein the fluidized-bed type furnace further includes means for controllably supplying fuel into the small fluidized bed.

7. A plant for manufacturing cement clinker according to claim 4 wherein the fluidized-bed type furnace further includes means for increasing fluidizing air to the small fluidized bed when the temperature of the small fluidized bed is higher than a predetermined temperature and for decreasing the fluidizing air to the small fluidized bed and/or increasing the supply amount of the fuel into the small fluidized bed when the temperature of the small fluidized bed is lower than a predetermined temperature.

8. A plant for manufacturing cement clinker according to claim 1 further including a cooling system in which the granulated and burned product is cooled.

9. A plant for manufacturing cement clinker according to claim 8 further comprising a cooling air introduction pipe connected to a portion of the furnace near the discharging chute.

10. A plant for manufacturing cement clinker according to claim 9 wherein the cooling air introduction pipe is adapted for introducing cooling air at a rate which is controlled such as to maintain the temperature of the cement clinker after the cooling below a predetermined temperature level.

11. A plant for manufacturing cement clinker according to claim 8, further comprising a draft tube disposed in the spouted bed in the spouted-bed type furnace such that a gap is formed between the lower end of the draft tube and the throat portion of the spouted-bed type granulating furnace, so as to positively form a local hot region in the draft tube while moving the granules into the draft tube through the gap.

12. A plant for manufacturing cement clinker according to claim 8, wherein the spouted-type furnace is branched at its lower portion into a plurality of cones, and the burners are provided on a lower portion of each of the cones.

13. A plant for manufacturing cement clinker comprising:
   a suspension preheater in which a cement material powder is preheated;
   a spouted-bed type furnace in which the preheated cement material powder is granulated, said spouted-bed type furnace having a straight barrel portion, a conical portion formed below said straight barrel portion, and a central lower throat portion connected to the bottom end portion of said conical portion so as to blow combustion air upwardly into said conical portion;
   a fluidized-bed type furnace in which the granulated cement material powder is sintered mounted below said spouted-bed furnace section and discharging combustion gas upwardly through said throat portion into said spouted-bed type furnace section;
   a cooling system in which the granulated and burned product is cooled;
   a plurality of burners disposed in a region in the vicinity of the juncture between the conical portion and the central throat portion so as to oppose one another and having ends directly obliquely upward to direct fuel along paths upwardly inclined and converging on a central axis of said spouted-bed furnace section whereby the fuel is burned with the combustion gas to form a local hot region in which the cement material powder is granulated directly above the throat portion in the spouted bed, the local hot region having a temperature substantially higher than at a peripheral region of said furnace section;
   a preheated material charging chute disposed slightly above the local hot region through which the preheated material powder from the suspension preheater is charged into the spouted-bed type furnace; and
   a granulated material discharging chute provided on one side of the local hot region.

14. A plant for manufacturing cement clinker according to claim 13, wherein the spouted-type furnace is branched at its lower portion into a plurality of cones, and the burners are provided on a lower portion of each of the cones.

15. A plant for manufacturing cement clinker according to claim 13, wherein the fluidized-bed, type furnace includes a partition plate which divides a fluidized bed and into a small fluidized bed and a large fluidized bed, the burned cement material overflows the partition plate into the small fluidized bed.

16. A plant for manufacturing cement clinker according to claim 15, wherein the fluidized-bed type furnace further includes means for maintaining a differential pressure of the small fluidized bed lower than that of the large fluidized bed.

17. A plant for manufacturing cement clinker according to claim 15 wherein the fluidized-bed type furnace further includes means for controllably supplying fuel into the small fluidized bed.

18. A plant for manufacturing cement clinker according to claim 15 wherein the fluidized-bed type furnace further includes means for increasing fluidizing air to the small fluidized bed when the temperature of the small fluidized bed is higher than a predetermined temperature and for decreasing the fluidizing air to the small fluidized bed and/or increasing the supply amount of the fuel into the small fluidized bed when the temperature of the small fluidized bed is lower than a predetermined temperature.

* * * * *